United States Patent
Saito et al.

(10) Patent No.: US 12,415,468 B2
(45) Date of Patent: Sep. 16, 2025

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 35 days.

(21) Appl. No.: 17/990,136

(22) Filed: Nov. 18, 2022

(65) Prior Publication Data

US 2023/0166674 A1    Jun. 1, 2023

(30) Foreign Application Priority Data

Nov. 26, 2021  (JP) ................... 2021-192255

(51) Int. Cl.
*B60R 16/02* (2006.01)
*H01B 7/40* (2006.01)

(52) U.S. Cl.
CPC .......... *B60R 16/0215* (2013.01); *H01B 7/40* (2013.01)

(58) Field of Classification Search
CPC .. H02G 3/04; H02G 3/30; H02G 3/32; H02G 3/40; H02G 3/0418; H02G 3/0462; H02G 3/0481; B60R 16/0207; B60R 16/0215; H01B 7/0045

See application file for complete search history.

(56) References Cited

U.S. PATENT DOCUMENTS

| | | | | |
|---|---|---|---|---|
| 2,408,253 | A * | 9/1946 | Diebold | H02G 7/00 174/136 |
| 3,810,490 | A * | 5/1974 | Ludwick | F16L 3/00 138/110 |
| 4,563,542 | A * | 1/1986 | Pollack | H02G 3/266 174/68.3 |
| 5,160,105 | A * | 11/1992 | Miller | A47C 7/002 248/188.9 |
| 5,560,397 | A * | 10/1996 | Miller | H02G 3/22 138/110 |
| 5,664,520 | A * | 9/1997 | Latimer, III | E05C 17/04 16/431 |
| 7,740,211 | B2 * | 6/2010 | Dukes | H02G 1/08 248/74.1 |
| 8,505,858 | B2 * | 8/2013 | Hansen | F16L 3/1226 174/664 |
| 9,062,801 | B2 * | 6/2015 | Billarant | F16L 3/1236 |
| 10,139,015 | B2 * | 11/2018 | VanValkenburgh | F16L 3/02 |
| 10,903,632 | B2 * | 1/2021 | Toll | F16L 3/1058 |
| 11,378,214 | B2 * | 7/2022 | Wolf | F16L 3/1222 |

(Continued)

FOREIGN PATENT DOCUMENTS

JP    2019-053894 A    4/2019

*Primary Examiner* — Paresh Paghadal
(74) *Attorney, Agent, or Firm* — Oliff PLC

(57) ABSTRACT

A wire harness including; a wire harness main body including an electric wire and an outer cover covering an outer circumference of the electric wire; a first route regulator that is attached to an outer circumference of the outer cover and regulates a route of the wire harness main body; and an attachment that is attached to a portion of an outer circumference of the first route regulator in a lengthwise direction of the first route regulator.

8 Claims, 8 Drawing Sheets

(56) References Cited

U.S. PATENT DOCUMENTS

| | | | |
|---|---|---|---|
| 2008/0116324 A1* | 5/2008 | Holder | F16L 3/1226 248/65 |
| 2014/0027584 A1* | 1/2014 | Pauchet | F16L 3/123 248/68.1 |
| 2014/0069691 A1* | 3/2014 | Cox | F02C 7/00 174/135 |
| 2014/0131528 A1* | 5/2014 | Blakeley | H02G 3/32 248/74.2 |
| 2016/0336682 A1* | 11/2016 | Markefka | H02G 3/0691 |
| 2017/0085067 A1* | 3/2017 | Sugimoto | H01R 13/5812 |
| 2018/0375306 A1* | 12/2018 | Peterson | H02G 3/0456 |
| 2019/0089142 A1 | 3/2019 | Sugino | |
| 2020/0274343 A1 | 8/2020 | Sugino | |

\* cited by examiner

WIRE HARNESS

BACKGROUND

The present disclosure relates to a wire harness.

Conventionally, an example of a wire harness for a vehicle is a wire harness that includes: a wire harness main body that includes an electric wire member and an outer cover member that covers the electric wire member; and a route-regulating member that is attached to an outer circumference thereof of an outer cover member and regulates the route of the wire harness main body (for example, see JP 2019-53894A).

SUMMARY

Incidentally, in the above-mentioned wire harness, a route-regulating member may be attached to an attachment member such as another route-regulating member, and in such a case, it is desired that no rattling occurs at an attachment site between the route-regulating member and an attachment member. Note that rattling at the attachment site leads to damage at the attachment site caused by vibration or the like, for example.

An exemplary aspect of the disclosure provides a wire harness capable of suppressing rattling.

The wire harness of the present disclosure includes: a wire harness main body including an electric wire and an outer cover covering an outer circumference of the electric wire; a first route regulator that is attached to an outer circumference of the outer cover and regulates a route of the wire harness main body; and an attachment that is attached to a portion of an outer circumference of the first route regulator in a lengthwise direction of the first route regulator, wherein: the first route regulator includes an insertion port that is open in a direction orthogonal to the lengthwise direction of the first route regulator and extends along an entire first route regulator in the lengthwise direction of the first route regulator, and the attachment includes a receiver covering a portion in a circumferential direction of the first route regulator, and a pliable band that covers an entire circumference of the first route regulator together with the receiver and binds the receiver and the first route regulator together.

According to a wire harness of this disclosure, it is possible to suppress rattling.

DETAILED DESCRIPTION OF EMBODIMENTS

Description of Embodiments of Present Disclosure

Figure 1:
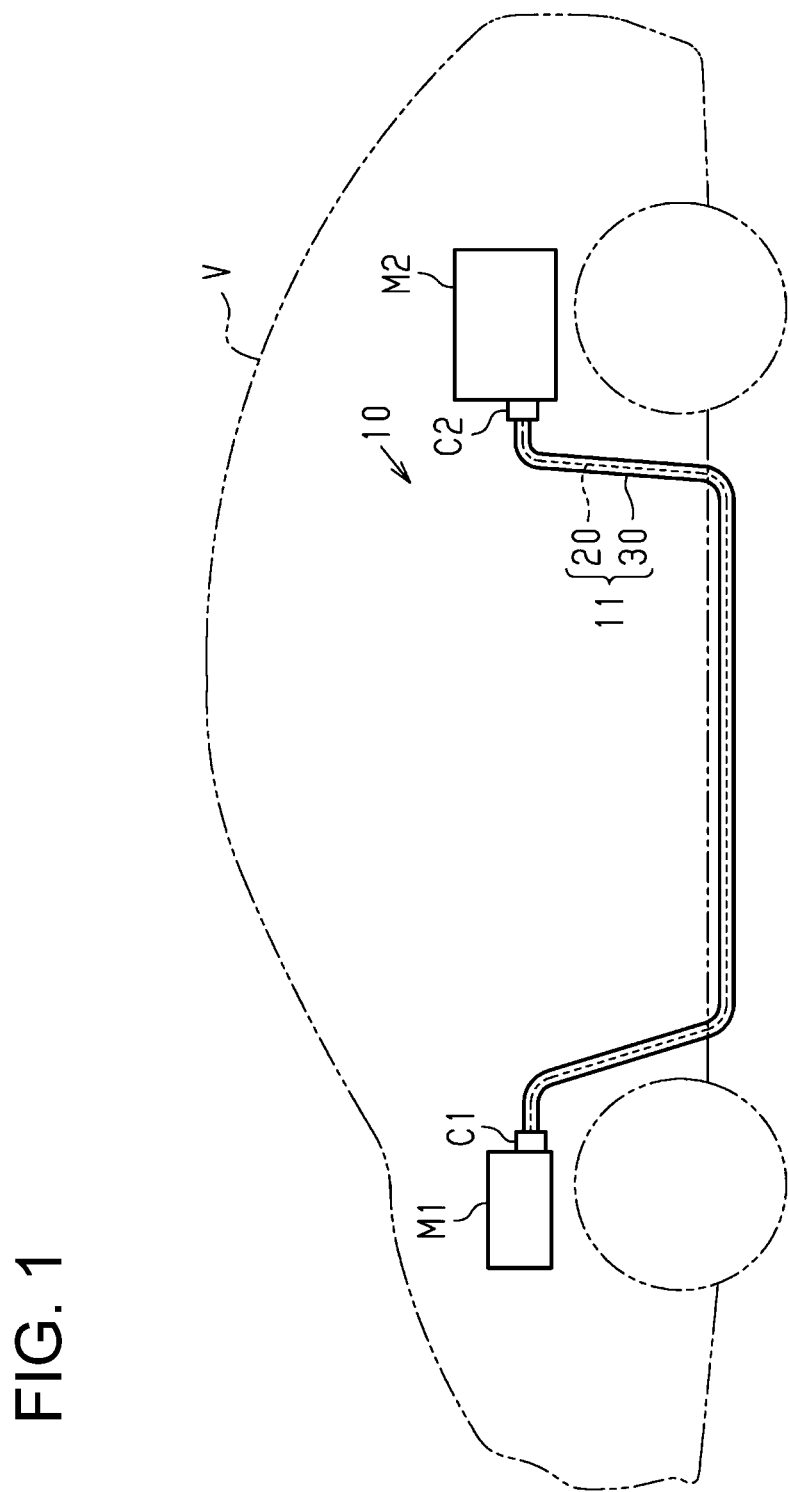
FIG. 1 is a schematic configuration diagram showing a wire harness according to an embodiment.

First, aspects of the present disclosure will be listed and described.

The wire harness of the present disclosure includes:

[1] a wire harness main body including an electric wire member and an outer cover member covering an outer circumference of the electric wire member; a first route-regulating member that is attached to an outer circumference of the outer cover member and regulates a route of the wire harness main body; and an attachment member that is attached to a portion of an outer circumference of the first route-regulating member in a lengthwise direction of the first route-regulating member, in which the first route-regulating member includes an insertion port that is open in a direction orthogonal to the lengthwise direction of the first route-regulating member and extends along the entire first route-regulating member in the lengthwise direction of the first route-regulating member, and the attachment member includes a receiving portion covering a portion in a circumferential direction of the first route-regulating member, and a pliable band that covers the entire circumference of the first route-regulating member together with the receiving portion and binds the receiving portion and the first route-regulating member together.

According to this configuration, the receiving portion and the first route-regulating member are bound together using the pliable band covering the entire circumference of the first route-regulating member together with the receiving portion covering a portion in the circumferential direction of the first route-regulating member. Doing so suppresses rattling between the receiving portion and the first route-regulating member compared to a configuration in which a lid is integrated with the receiving portion via thin hinge portions and the lid is locked to the receiving portion through engagement using a claw portion in a closed state, for example. That is, in a configuration in which thin hinge portions and claw portions are provided, rattling between the receiving portion and the lid occurs at the hinge portions and the claw portions, but such rattling can be avoided. Therefore, the receiving portion and the band can hold the first route-regulating member without rattling, and thus rattling between the first route-regulating member and the attachment member can be suppressed.

[2] It is preferable that the band is a cable tie that includes a pliable belt-shaped portion and a locking portion that is provided at an end portion of the belt-shaped portion in a lengthwise direction of the belt-shaped portion and regulates movement of the belt-shaped portion in a removing direction, which is a direction opposite to a direction in which the belt-shaped portion is passed therethrough, in a state in which the belt-shaped portion is passed therethrough, and the cable tie is attached so as to cover the entire circumferential portion of the receiving portion and cover the entire circumference of the first route-regulating member together with the receiving portion.

According to this configuration, because the band is a cable tie that includes the belt-shaped portion and the locking portion, a known cable tie can be used, for example, and be easily obtained. Also, because the cable tie is attached so as to cover the entire circumferential portion of the receiving portion and cover the entire circumference of the first route-regulating member together with the receiving portion, it is possible to bind the receiving portion and the first route-regulating member together so as to fasten the entire circumference of the first route-regulating member, and to favorably suppress rattling between the receiving portion and the first route-regulating member.

[3] It is preferable that the receiving portion includes an engagement portion capable of engaging with the belt-shaped portion in a lengthwise direction of the receiving portion.

According to this configuration, because the receiving portion includes the engagement portion capable of engaging with the belt-shaped portion in the lengthwise direction of the receiving portion, it is possible to inhibit the belt-shaped portion from shifting in the lengthwise direction of the receiving portion. Therefore, rattling between the receiving portion and the first route-regulating member can be stably suppressed.

[4] It is preferable that the engagement portion is provided at two end portions of the receiving portion in a circumferential direction of the receiving portion.

According to this configuration, because the engagement portion is provided at two end portions of the receiving portion in the circumferential direction thereof, it is possible to favorably inhibit the belt-shaped portion from shifting in the lengthwise direction of the receiving portion.

[5] It is preferable that the band extends from one end portion of the receiving portion in the circumferential direction of the receiving portion, is fixed to the other end portion, and binds the receiving portion and the first route-regulating member together.

[6] It is preferable that the band is a component molded integrally with the receiving portion.

According to this configuration, because the band is a component molded integrally with the receiving portion, the number of components can be reduced compared to a configuration in which the band and the receiving portion are separate from each other, for example.

[7] It is preferable that the attachment member is a second route-regulating member that is attached to the outer circumference of the outer cover member and regulates the route of the wire harness main body, and the receiving portion is provided at an end portion in a lengthwise direction of the second route-regulating member and covers a circumferential portion of an end portion in the lengthwise direction of the first route-regulating member.

According to this configuration, because the receiving portion is provided at the end portion in the lengthwise direction of the second route-regulating member and covers the circumferential portion of the end portion in the lengthwise direction of the first route-regulating member, the first route-regulating member and the second route-regulating member are connected to each other in the lengthwise direction. Therefore, the route of the wire harness main body is regulated by the first route-regulating member and the second route-regulating member.

[8] It is preferable that the first route-regulating member regulates the route of a straight section, which is a section having a linear shape in the route of the wire harness main body, and the second route-regulating member regulates the route of a bent section, which is a section that is bent in the route of the wire harness main body.

According to this configuration, the route of the straight section is regulated by the first route-regulating member, and the route of the bent section is regulated by the second route-regulating member. As a result, the routes of the straight section and the bent section of the wire harness are continuously prevented from deviating from the desired routes.

Details of Embodiments of the Present Disclosure

Specific examples of the wire harness of the present disclosure will be described below with reference to the drawings. In each drawing, for convenience of description, portions of the configuration may be exaggerated or simplified. Also, the dimensional proportions of each portion may differ between drawings. In the present specification, "parallel" and "orthogonal" include not only the case of being strictly parallel and orthogonal, but also the case of being approximately parallel and orthogonal within a range in which the actions and effects of the present embodiment are exhibited. Note that the present disclosure is not limited to these examples, and is indicated by the claims, and is intended to include all modifications within the meaning and scope equivalent to the claims.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 has an elongated shape that extends in a front-rear direction of the vehicle V, for example. The wire harness 10 is routed in the vehicle V so that, for example, an intermediate portion in the lengthwise direction of the wire harness 10 passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to the motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular outer cover member 30 (outer cover) that covers the outer circumference of the electric wire member 20. The wire harness 10 has connectors C1 and C2 that are respectively attached to two end portions of the electric wire member 20. One end portion in the lengthwise direction of the electric wire member 20 is connected to the inverter M1 via the connector C1, and the other end portion in the lengthwise direction of the electric wire member 20 is connected to the high-voltage battery M2 via the connector C2.

Figure 2:
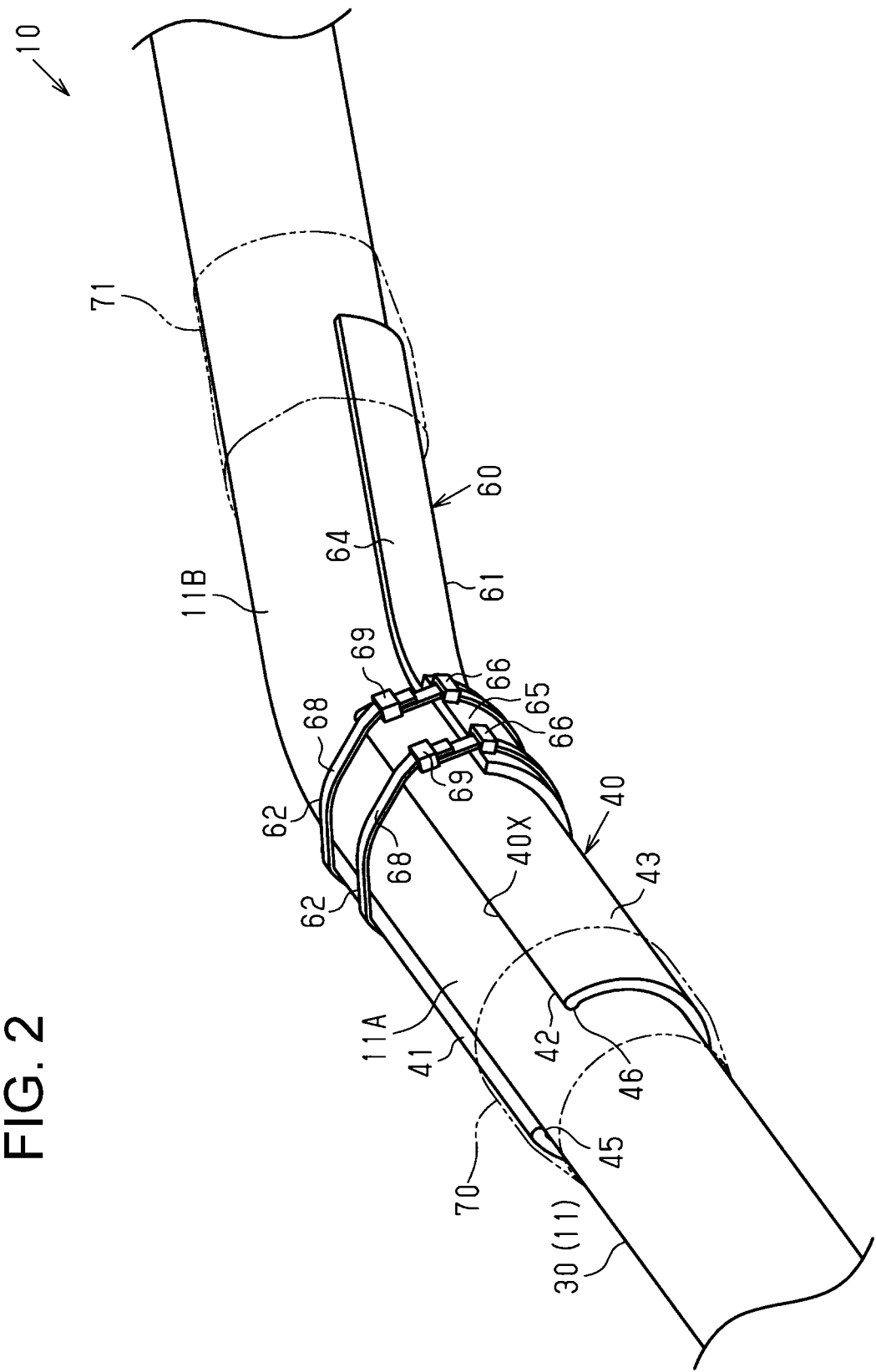
FIG. 2 is a schematic perspective view showing a wire harness according to an embodiment.
Figure 3:
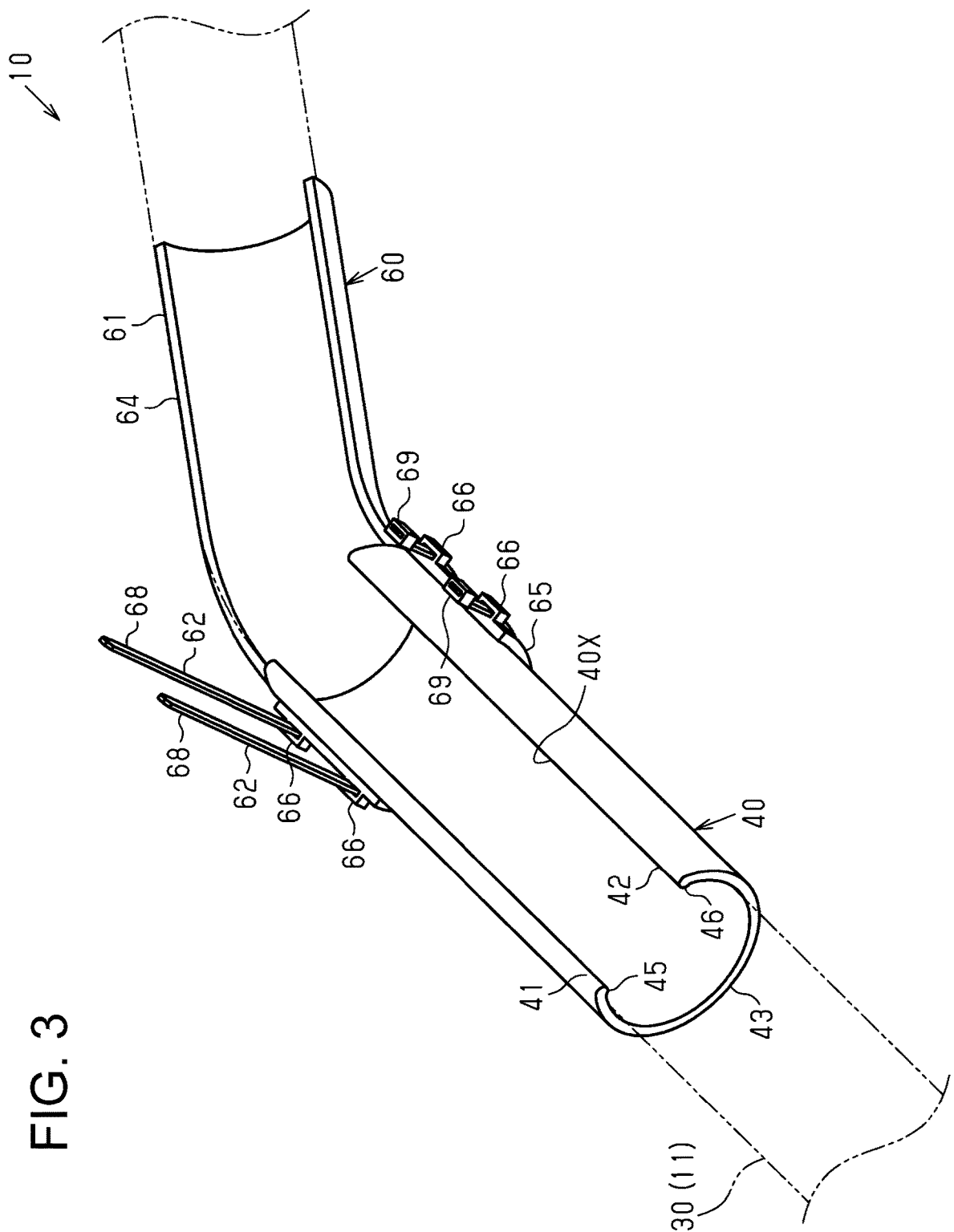
FIG. 3 is a schematic perspective view showing a wire harness according to an embodiment.

As shown in FIGS. 2 and 3, the wire harness 10 includes a first route-regulating member 40 (first route regulator) that is attached to the outer circumference of the outer cover member 30 and a second route-regulating member 60 (second route regulator) that is attached to the outer circumference of the outer cover member 30 and serves as an attachment member. The first route-regulating member 40 and the second route-regulating member 60 regulate the route along which the wire harness main body 11 is routed. Note that the first route-regulating member 40 and the second route-regulating member 60 are omitted from FIG. 1.

Configuration of Electric Wire Member 20

Figure 4:
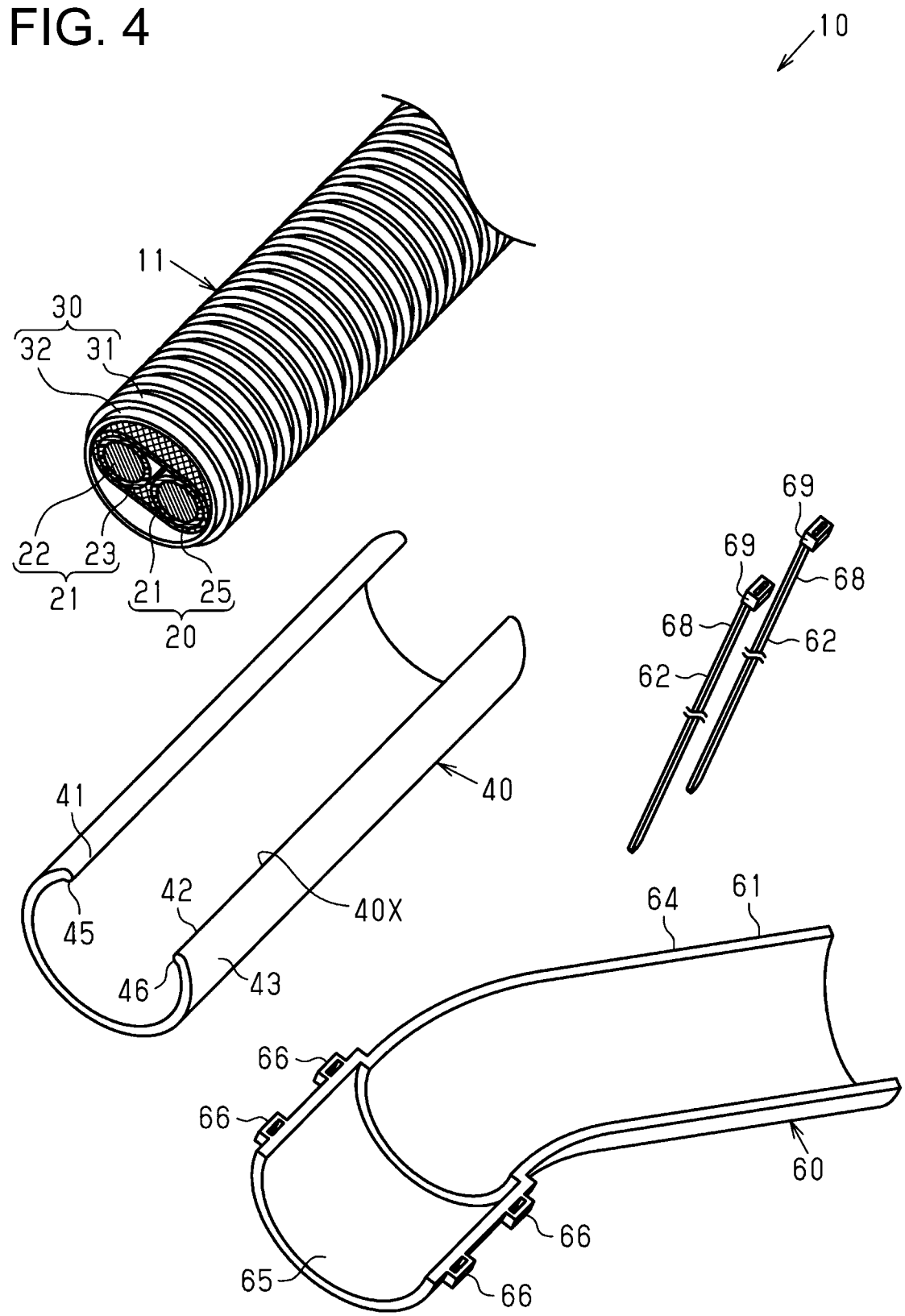
FIG. 4 is a schematic exploded perspective view showing a wire harness according to an embodiment.
Figure 6:
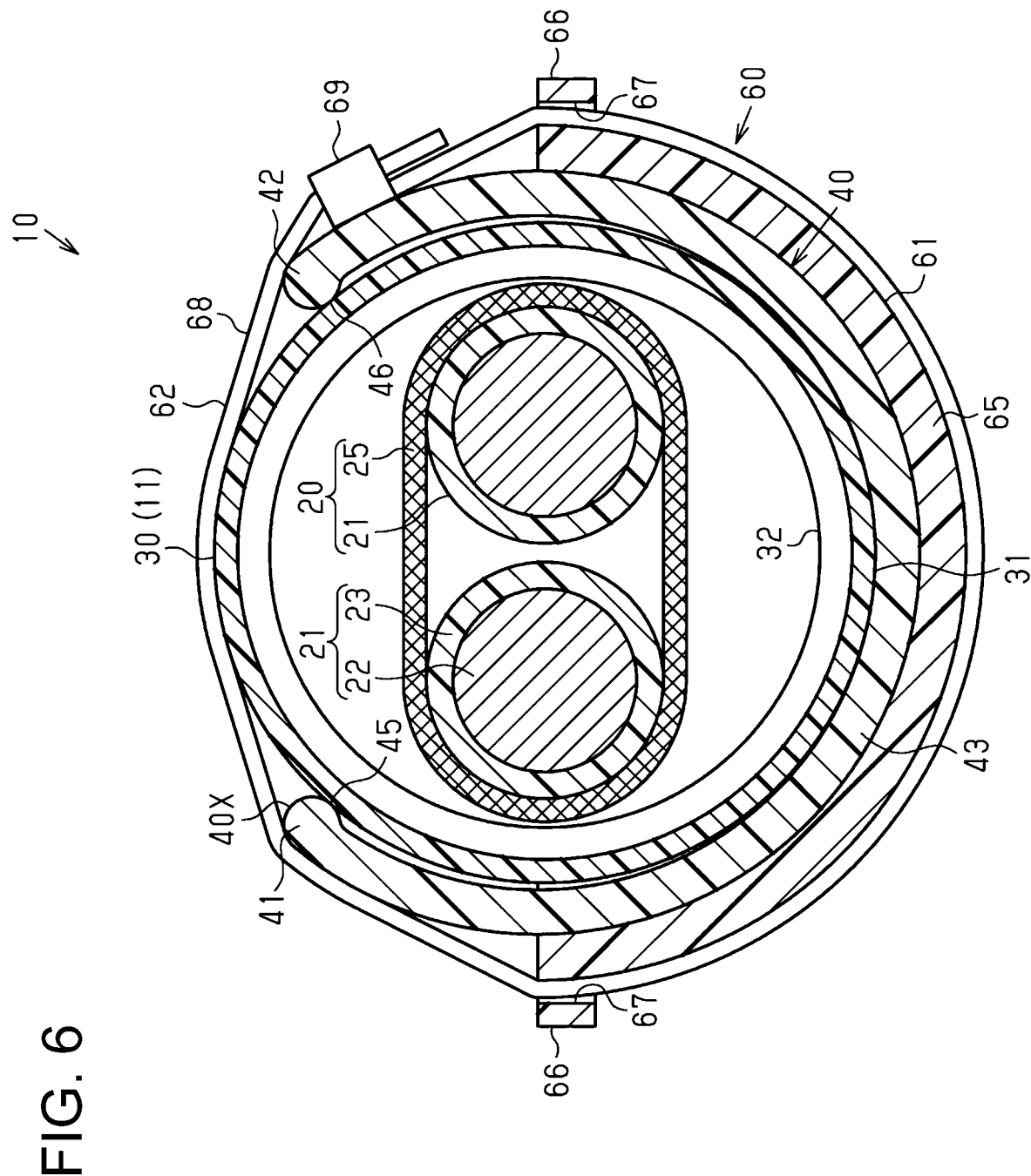
FIG. 6 is a schematic transverse cross-sectional view showing a wire harness according to an embodiment.

As shown in FIGS. 4 and 6, for example, the electric wire member 20 includes one or more electric wires 21 (e.g., two electric wires 21 in this embodiment) and a braided member 25 that collectively encloses the outer circumferences of the plurality of electric wires 21.

As shown in FIG. 6, each electric wire 21 is a coated electric wire that includes a conductive core wire 22 and an insulating coating 23 that encloses the outer circumference of the core wire 22 and has insulating properties. Each electric wire 21 is, for example, a high-voltage electric wire that can support a high voltage and a large current. Each electric wire 21 may be, for example, a non-shielded electric wire that does not include an electromagnetic shield structure, or a shielded electric wire that includes an electromagnetic shield structure. Each electric wire 21 in the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminium-based material may be used, for example.

The insulating coating 23 covers, for example, all the way around the outer circumferential surface of the core wire 22. The insulating coating 23 is constituted by, for example, a resin material that has insulating properties.

The cross-sectional shape of each wire 21 taken along a plane that is orthogonal to the lengthwise direction of each wire 21, that is, the transverse cross-sectional shape of each wire 21, may be any shape. The transverse cross-sectional shape of each electric wire 21 may be, for example, a circular shape, a semi-circular shape, a polygonal shape, a square shape, a flat shape, or the like. The transverse cross-sectional shape of each electric wire 21 in the present embodiment is a circular shape.

The braided member 25 has, for example, an overall tubular shape that collectively encloses the outer circumferences of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminium-based material may be used, for example. Although not shown in the drawings, the two end portions of the braided member 25 in the lengthwise direction are grounded at, for example, the connectors C1 and C2 (see FIG. 1).

Configuration of Outer Cover Member 30

As shown in FIG. 4, the outer cover member 30 has a tubular shape that encloses all the way around the outer circumference of the electric wire member 20. The outer cover member 30 in the present embodiment is formed in a cylindrical shape. The outer cover member 30 is, for example, provided with a circumferential wall that is formed so as to be continuous all the way around the circumferential surface of the outer cover member 30. The outer cover member 30 seals, for example, the inside of the outer cover member 30 all the way around the circumferential surface of the outer cover member 30. The outer cover member 30 has, for example, a function of protecting the electric wire member 20 from flying objects and water droplets.

The outer cover member 30 is, for example, flexible and is easy to bend. Examples of the flexible outer cover member 30 include a resin corrugated tube and a rubber waterproof cover. The outer cover member 30 of this embodiment is a resin corrugated tube having an accordion shape whose diameter repeatedly increases and decreases in the lengthwise direction of the outer cover member 30. That is, the outer cover member 30 of this embodiment has an accordion structure in which large-diameter portions 31 and small-diameter portions 32 whose diameter is smaller than that of the large-diameter portions 31 are alternately and continuously provided along the lengthwise direction of the outer cover member 30. Each of the large-diameter portions 31 and the small-diameter portions 32 has, for example, a ring shape that encircles the outer cover member 30 once in the circumferential direction. As the material of the outer cover member 30, for example, a synthetic resin such as polyolefin, polyamide, polyester, or ABS resin can be used. Note that in FIGS. 1 to 3, the outer cover member 30 is shown simplified for the sake of simplifying the drawings.

Configuration of First Route-Regulating Member 40 and Second Route-Regulating Member 60

As shown in FIGS. 2 and 3, each of the first route-regulating member 40 and the second route-regulating member 60 holds the outer cover member 30. Each of the first route-regulating member 40 and the second route-regulating member 60 is harder than, for example, the outer cover member 30. Each of the first route-regulating member 40 and the second route-regulating member 60 has a hardness that makes it less likely to bend in a direction orthogonal to the lengthwise direction of the wire harness main body 11 compared to the outer cover member 30. As a result, the first route-regulating member 40 and the second route-regulating member 60 regulate the route of the wire harness main body 11. For example, the first route-regulating member 40 and the second route-regulating member 60 assist the outer cover member 30 so that the wire harness main body 11 does not deviate from the desired route as a result of bending under its own weight or the like.

As shown in FIG. 2, the first route-regulating member 40 is provided along a portion in the lengthwise direction of the wire harness main body 11. For example, the first route-regulating member 40 is attached to the outer circumference of the outer cover member 30 along a straight section 11A, which is a straight section of the route of the wire harness main body 11. The first route-regulating member 40 regulates the route of the wire harness main body 11 in the straight section 11A. Here, the straight section 11A is a section in which the route of the wire harness main body 11 extends linearly in one direction. Note that one or more first route-regulating members 40 are provided depending on the route of the wire harness main body 11.

The second route-regulating member 60 is provided along a portion in the lengthwise direction of the wire harness main body 11. For example, the second route-regulating member 60 is attached to the outer circumference of the outer cover member 30 along a bent section 11B, which is a bent section of the route of the wire harness main body 11. The second route-regulating member 60 regulates the route of the wire harness main body 11 in the bent section 11B. Here, the bent section 11B is a section in which the route of the wire harness main body 11 is bent so as to deviate from a straight line. Note that one or more second route-regulating members 60 are provided depending on the route of the wire harness main body 11.

Configuration of First Route-Regulating Member 40

As shown in FIG. 6, the first route-regulating member 40 covers a portion of the outer circumference of the outer cover member 30 in the circumferential direction of the outer cover member 30. The first route-regulating member 40 has a shape that covers a portion of the outer circumference of the outer cover member 30 in the circumferential direction of the outer cover member 30. The transverse cross-sectional shape of the first route-regulating member 40 is C-shaped overall. The first route-regulating member 40 covers, for example, an area greater than half of the outer circumference of the outer cover member 30. That is, the first route-regulating member 40 covers an area greater than half of the entire outer circumference of the outer cover member 30 in the circumferential direction of the outer cover member 30. As shown in FIG. 2, the first route-regulating member 40 extends in the lengthwise direction of the outer cover member 30 in the straight section 11A. The first route-regulating member 40 is formed in a shape extending linearly in one direction, for example. The transverse cross-sectional shape of the first route-regulating member 40 is, for example, uniform over the entire length of the first route-regulating member 40 in the lengthwise direction of the first route-regulating member 40.

The first route-regulating member 40 is made of metal or resin, for example. The first route-regulating member 40 in the present embodiment is made of resin. As the material of the first route-regulating member 40, a synthetic resin such as polypropylene, polyamide, or polyacetal may be used, for example. The first route-regulating member 40 may be manufactured using a well-known manufacturing method such as extrusion molding or injection molding, for example. In this embodiment, the first route-regulating member 40 is an extruded product manufactured through extrusion molding. Therefore, the first route-regulating member 40 can be easily manufactured using an extrusion machine that extrudes a raw material of the first route-regulating member 40 in a lengthwise direction. Also, a plurality types of first route-regulating members 40 having different dimensions in the lengthwise direction can be manufactured using a single extrusion machine. A plurality types of first route-regulating members 40 having different dimensions in the lengthwise direction can be manufactured by cutting a base material of the first route-regulating member 40, which has been formed using a single extrusion machine, using a cutting device to a desired length, for example.

The first route-regulating member 40 has an insertion port 40X that is open in a direction orthogonal to the lengthwise direction of the first route-regulating member 40. The insertion port 40X extends along the entire first route-regulating member 40 in the lengthwise direction of the first route-regulating member 40. The first route-regulating member 40 has a first end portion 41 and a second end portion 42 that are two end portions in the circumferential direction of the first route-regulating member 40 and form the insertion port 40X. The first route-regulating portion 40 has a connection portion 43 that connects the first end portion 41 and the second end portion 42 to each other. In other words, the first route-regulating member 40 has the connection portion 43 formed so as to cover a portion of the outer cover member 30 in the circumferential direction thereof, the first end portion 41 and the second end portion 42 that are provided at two end portions of the connection portion 43, and the insertion port 40X formed by the first end portion 41 and the second end portion 42.

As shown in FIG. 6, the connection portion 43 forms the main part of the first route-regulating member 40. The thickness in the radial direction of connection portion 43 is, for example, uniform in the circumferential direction of the first route-regulating member 40. The transverse cross-sectional shape of the connection portion 43 is formed, for example, in a shape that extends along the outer surface of the outer cover member 30. The transverse cross-sectional shapes of the first end portion 41, the second end portion 42, and the connection portion 43 are formed, for example, in an arc shape.

The first end portion 41 and the second end portion 42 are provided on mutually opposite sides in the circumferential direction of the first route-regulating member 40. The first end portion 41 and the second end portion 42 are provided spaced apart from each other with the insertion port 40X interposed therebetween in the circumferential direction of the first route-regulating member 40. In other words, the gap between the first end portion 41 and the second end portion 42 in the circumferential direction of the first route-regulating member 40 forms the insertion port 40X. As described above, the first route-regulating member 40 is formed in a C shape having the insertion port 40X in a portion in the circumferential direction of the first route-regulating member 40.

The transverse cross-sectional shapes of the leading ends of the first end portion 41 and the second end portion 42 are formed in curved shapes. The transverse cross-sectional shapes of the leading ends of the first end portion 41 and the second end portion 42 in this embodiment are formed in arc shapes.

The first route-regulating portion 40 has a protruding portion 45 that protrudes from the inner surface of the first end portion 41 and a protruding portion 46 that protrudes from the inner surface of the second end portion 42. The protruding portions 45 and 46 protrude toward the outer cover member 30 inserted into the first route-regulating member 40 and come into contact with the outer surface of the outer cover member 30. The protruding portions 45 and 46 are in contact with the outer surfaces of large-diameter portions 31 of the outer cover member 30. The protruding portion 45 protrudes from the inner surface of the leading end of the first end portion 41, for example. The protruding portion 46 protrudes from the inner surface of the leading end of the second end portion 42, for example. The transverse cross-sectional shapes of the protruding portions 45 and 46 are formed in curved shapes, for example. The transverse cross-sectional shapes of the protruding portions 45 and 46 in this embodiment are formed in arc shapes.

As shown in FIG. 3, the protruding portions 45 and 46 extend in the lengthwise direction of the first route-regulating member 40. The protruding portions 45 and 46 extend along the entire length of the first route-regulating member 40 in the lengthwise direction of the first route-regulating member 40, for example.

The protruding portions 45 and 46 press the outer cover member 30 from the outer side of the outer cover member 30. The outer cover member 30 is elastically held by the protruding portions 45 and 46, and the connection portion 43. As a result, the connection between the first route-regulating member 40 and the outer cover member 30 is strengthened.

As shown in FIG. 6, the opening width of the insertion port 40X, that is, the shortest distance between the first end portion 41 and the second end portion 42, is smaller than the outer diameter of the outer cover member 30.

When the first route-regulating member 40 is elastically deformed, the opening width of the insertion port 40X increases. When the outer cover member 30 is inserted into the insertion port 40X in a direction orthogonal to the lengthwise direction of the first route-regulating member 40, for example, the opening width of the insertion port 40X increases. Once the outer cover member 30 has been inserted into the first route-regulating member 40, the first route-regulating member 40 elastically returns to return to its original shape. As a result, the opening width of the insertion port 40X becomes smaller than the outer diameter of the outer cover member 30, and therefore the first route-regulating member 40 is attached to the outer circumference of the outer cover member 30.

Configuration of Second Route-Regulating Member 60

As shown in FIG. 2, the second route-regulating member 60 is attached to a portion of the outer circumference of the first route-regulating member 40 in the lengthwise direction. The second route-regulating member 60 is attached to the outer circumference of an end portion in the lengthwise direction of the first route-regulating member 40. Also, the second route-regulating member 60 is attached to the outer circumference of the outer cover member 30 in the bent section 11B. The second route-regulating member 60 extends in the lengthwise direction of the outer cover member 30 in the bent section 11B. The second route-regulating member 60 is bent following the shape of the bent section 11B, for example.

The second route-regulating member 60 has a second route-regulating main body 61 and a cable tie 62 serving as a band.

The second route-regulating main body 61 and the cable tie 62 that constitute the second route-regulating member 60 are made of metal or resin, for example. The second route-regulating main body 61 and the cable tie 62 in this embodiment are made of resin. As the materials of the second route-regulating main body 61 and the cable tie 62, for example, a synthetic resin such as polypropylene, polyamide, or polyacetal can be used. The second route-regulating main body 61 and the cable tie 62 may be manufactured using a well-known manufacturing method such as injection molding, for example.

The second route-regulating main body 61 includes a main body portion 64 and a receiving portion 65 (receiver).

The main body portion 64 covers a portion of the outer circumference of the outer cover member 30 in the circumferential direction of the outer cover member 30. The main body portion 64 has a shape that covers a portion of the outer circumference of the outer cover member 30 in the circumferential direction of the outer cover member 30. The transverse cross-sectional shape of the main body portion 64 is semi-cylindrical overall. The main body portion 64 covers half of the outer circumference of the outer cover member 30. As shown in FIG. 2, the main body portion 64 extends in the lengthwise direction of the outer cover member 30 in the bent section 11B. The main body portion 64 is bent following the shape of the bent section 11B.

The receiving portion 65 is provided at an end portion in the lengthwise direction of the second route-regulating member 60, i.e., an end surface in the lengthwise direction of the main body portion 64. The receiving portion 65 covers a portion of the outer circumference of the first route-regulating member 40 in the circumferential direction of the first route-regulating member 40. The receiving portion 65 covers a circumferential portion of the end portion in the lengthwise direction of the first route-regulating member 40. The receiving portion 65 has a shape that covers a portion of the outer circumference of the first route-regulating member 40 in the circumferential direction of the first route-regulating member 40. The transverse cross-sectional shape of the receiving portion 65 is semi-cylindrical overall. The receiving portion 65 has a semi-cylindrical shape whose diameter is larger than that of the main body portion 64. The receiving portion 65 covers half of the outer circumference of the first route-regulating member 40.

Figure 5:
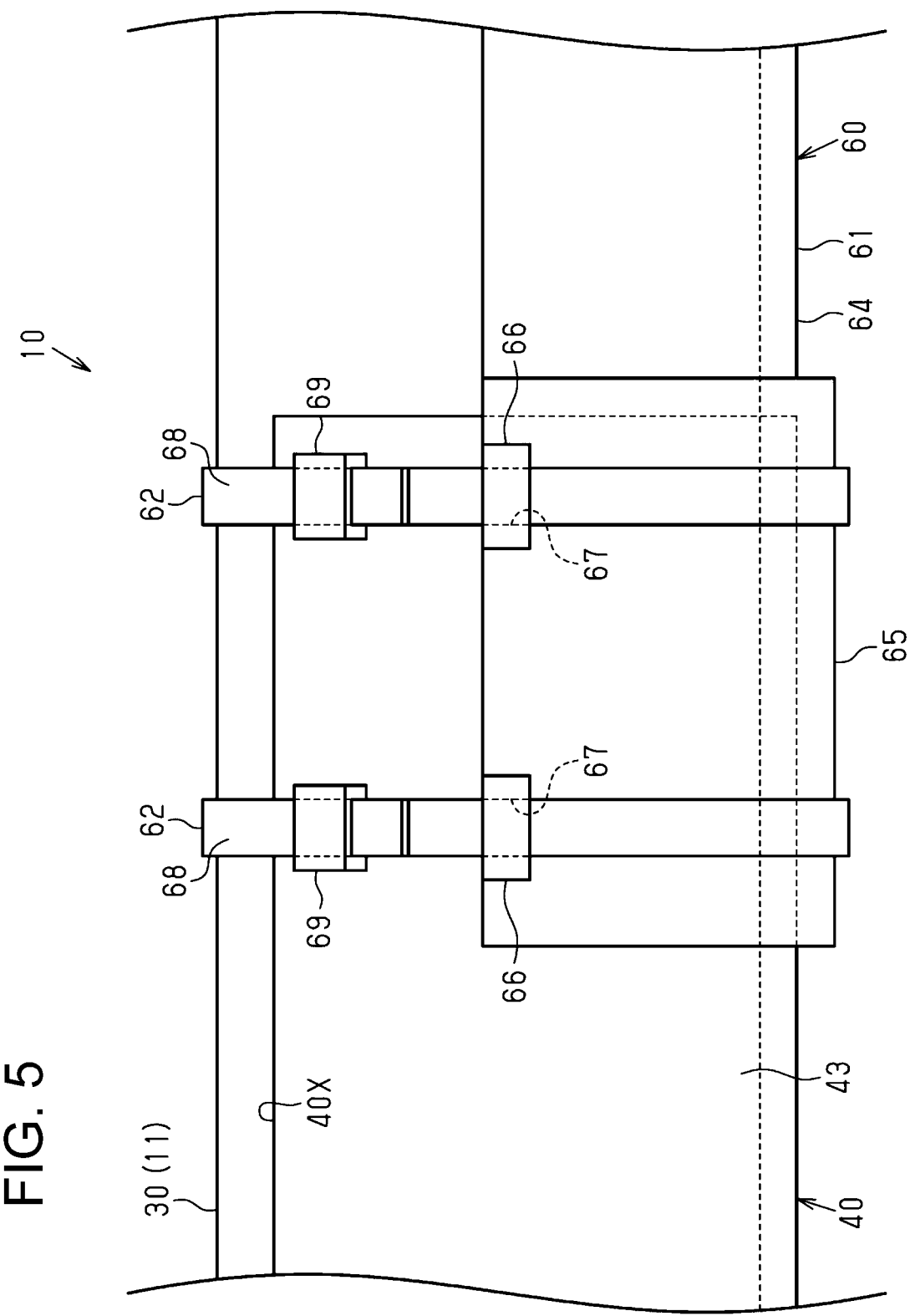
FIG. 5 is a schematic side view showing a wire harness according to an embodiment.

As shown in FIGS. 2 to 6, the receiving portion 65 has engagement portions 66 (engagements). The engagement portions 66 are respectively provided at two end portions of the receiving portion 65 in the circumferential direction thereof. The engagement portions 66 protrude outward in a radial direction from the two end portions of the receiving portion 65 in the circumferential direction. As shown in FIG. 5, two engagement portions 66 are provided in the lengthwise direction of the receiving portion 65. As shown in FIG. 6, each engagement portion 66 has a through-hole 67. The through-hole 67 extends in a tangential direction of an arc extending along the outer circumferential surface of the receiving portion 65. The directions in which the through-holes 67 of the two engagement portions 66 in the circumferential direction of the receiving portion 65 extend are parallel to each other.

The cable tie 62 covers the entire circumference of the first route-regulating member 40 together with the receiving portion 65 and binds the receiving portion 65 and the first route-regulating member 40 together.

Specifically, the cable tie 62 includes a flexible and pliable belt-shaped portion 68 (pliable belt) and a locking portion 69 (lock) provided at an end portion of the belt-shaped portion 68 in the lengthwise direction thereof. The locking portion 69 regulates movement of the belt-shaped portion 68 in a removing direction that is a direction opposite to the direction in which the belt-shaped portion 68 is passed therethrough, and locks the belt-shaped portion 68, in a state in which the belt-shaped portion 68 is passed therethrough.

The cable tie 62 is attached so as to cover the entire circumferential portion of the receiving portion 65 and cover the entire circumference of the first route-regulating member 40 together with the receiving portion 65, with the belt-shaped portion 68 being passed through the through-hole 67 of the engagement portion 66. In other words, the cable tie 62 covers the entire circumference of the first route-regulating member 40 along the outer circumference of the first route-regulating member 40 together with the receiving portion 65. Also, the cable tie 62 binds the receiving portion 65 and the first route-regulating member 40 together such that the first route-regulating member 40 does not separate from the receiving portion 65. Further, the engagement portion 66 is capable of engaging with the belt-shaped portion 68 in the lengthwise direction of the second route-regulating member 60 and in the lengthwise direction of the receiving portion 65. The engagement portion 66 inhibits the belt-shaped portion 68 from shifting in the lengthwise direction of the second route-regulating member 60 and in the lengthwise direction of the receiving portion 65. Note that once the leading end portion of the belt-shaped portion 68 that has been passed through the locking portion 69, the leading portion is no longer required. Therefore, in FIGS. 2, 5, and 6 that show a state in which the cable tie 62 is attached, the leading end portion of the belt-shaped portion 68 is cut off.

Also, as shown in FIG. 2, the wire harness 10 includes a slide regulating member 70 that regulates sliding movement of the first route-regulating member 40 in the lengthwise direction of the outer cover member 30, for example. The wire harness 10 includes a slide regulating member 71 that regulates sliding movement of the second route-regulating member 60 in the lengthwise direction of the outer cover member 30, for example. Cable ties made of resin or metal, crimp rings, adhesive tape, or the like can be used as the slide regulating members 70 and 71, for example. The slide regulating members 70 and 71 of this embodiment are pieces of adhesive tape. The slide regulating member 70 is wound around the end portion of the first route-regulating member 40 that is not connected to the second route-regulating member 60, and the outer cover member 30. The slide regulating member 71 is wound around the end portion of the second route-regulating member 60 that is not connected to the first route-regulating member 40, and the outer cover member 30.

Next, operation of this embodiment will be described.

The receiving portion 65 and the first route-regulating member 40 are bound together using the cable tie 62. Therefore, the state in which the first route-regulating member 40 and the second route-regulating member 60 are connected to each other is maintained. Thus, the route of the wire harness main body 11 is continuously regulated.

Next, effects of the above-described embodiment will be described below.

(1) The receiving portion 65 and the first route-regulating member 40 are bound together using the pliable cable tie 62 that covers the entire circumference of the first route-regulating member 40 together with the receiving portion 65 covering a portion of the first route-regulating member 40 in the circumferential direction. Doing so suppresses rattling between the receiving portion 65 and the first route-regulating member 40 compared to a configuration in which a lid is integrated with the receiving portion 65 via thin hinge portions and the lid is locked to the receiving portion 65 through engagement using a claw portion in a closed state, for example. That is, in a configuration in which thin hinge portions and claw portions are provided, rattling between the receiving portion 65 and the lid is likely to occur at the hinge portions and the claw portions, but such rattling can be avoided. Therefore, the receiving portion 65 and the cable tie 62 can hold the first route-regulating member 40 without rattling, and it is possible to suppress rattling of the first route-regulating member 40 and the second route-regulating member 60. As a result, it is possible to suppress damage at the attachment site where the first route-regulating member 40 and the second route-regulating member 60 are attached to each other, and thus to stably regulate the route of the wire harness main body 11.

(2) Because the band that binds the receiving portion 65 and the first route-regulating member 40 together is the cable tie 62 that includes the belt-shaped portion 68 and the locking portion 69, a known cable tie can be used, for example, and be easily obtained. Also, because the cable tie 62 is attached so as to cover the entire circumferential portion of the receiving portion 65 and cover the entire circumference of the first route-regulating member 40 together with the receiving portion 65, it is possible to bind the receiving portion 65 and the first route-regulating member 40 together so as to fasten the entire circumference of the first route-regulating member 40. Therefore, rattling between the receiving portion 65 and the first route-regulating member 40 can be favorably suppressed.

(3) Because the receiving portion 65 has the engagement portions 66 that are each capable of engaging with the belt-shaped portion 68 in the lengthwise direction of the second route-regulating member 60 and in the lengthwise direction of the receiving portion 65, it is possible to inhibit the belt-shaped portion 68 from shifting in the lengthwise direction of the receiving portion 65. Therefore, rattling between the receiving portion 65 and the first route-regulating member 40 can be stably suppressed.

(4) Because the engagement portions 66 are respectively provided at two end portions of the receiving portion 65 in the circumferential direction thereof, it is possible to favorably inhibit the belt-shaped portions 68 from shifting in the lengthwise direction of the receiving portion 65.

(5) The attachment member (attachment) to be attached to the first route-regulating member 40 is the second route-regulating member 60 that is attached to the outer circumference of the outer cover member 30 and regulates the route of the wire harness main body 11. Also, because the receiving portion 65 is provided at the end portion in the lengthwise direction of the second route-regulating member 60 and covers the circumferential portion of the end portion in the lengthwise direction of the first route-regulating member 40, the first route-regulating member 40 and the second route-regulating member 60 are connected to each other in the lengthwise direction. Therefore, the route of the wire harness main body 11 is continuously regulated by the first route-regulating member 40 and the second route-regulating member 60.

(6) The route of the straight section 11A of the wire harness main body 11 is regulated by the first route-regulating member 40, and the route of the bent section 11B of the wire harness main body 11 is regulated by the second route-regulating member 60. As a result, the routes of the straight section 11A and the bent section 11B of the wire harness main body 11 are continuously prevented from deviating from the desired routes.

OTHER EMBODIMENTS

The above embodiment can be modified and implemented as follows. The above embodiment and the following modifications can be implemented in combination with each other as long as no contradiction arises.

Although the engagement portions 66 each have the through-hole 67 in the above-described embodiment, the engagement portion 66 need not have the through-hole 67 as long as the engagement portion 66 is capable of engaging with the belt-shaped portion 68 in the lengthwise direction of the second route-regulating member 60 and in the lengthwise direction of the receiving portion 65.

Figure 7:
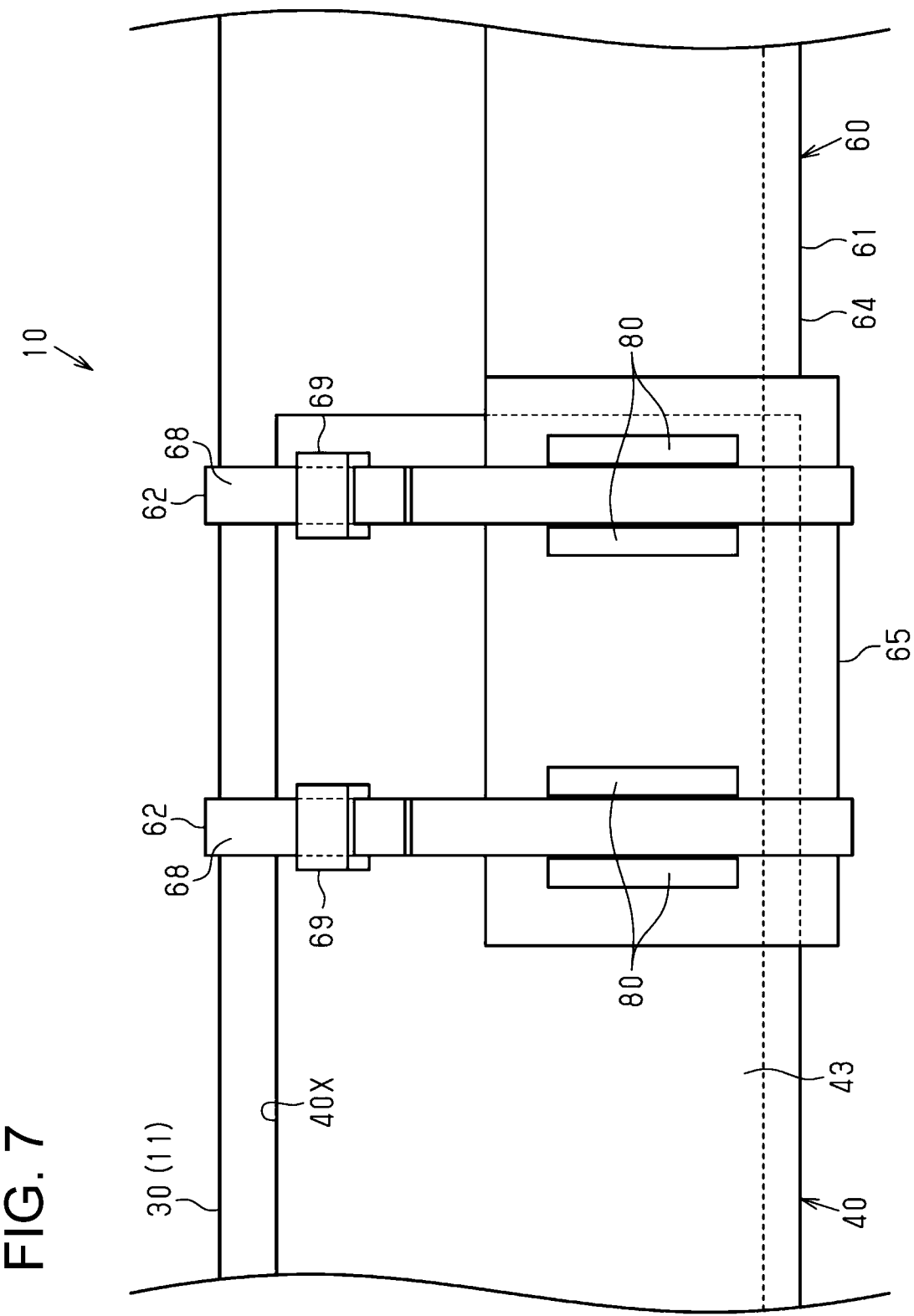
FIG. 7 is a schematic side view showing a wire harness according to a modified example.

Modifications can be made as shown in FIG. 7, for example. A pair of engagement portions 80 in this example are provided so as to protrude from the outer circumferential surface of the receiving portion 65 and be arranged side-by-side in the lengthwise direction of the receiving portion 65. Note that two pairs of engagement portions 80 in this example are provided such that two engagement portions 80 are arranged side-by-side in the lengthwise direction of the receiving portion 65. Also, the belt-shaped portion 68 is disposed to extend between the pair of engagement portions 80. Doing this also can inhibit the belt-shaped portion 68 from shifting in the lengthwise direction of the receiving portion 65.

Also, the engagement portions 80 in this example are provided in an intermediate portion of the receiving portion 65 in the circumferential direction, instead of being provided at two end portions of the receiving portion 65 in the circumferential direction thereof. The engagement portions 66 or 80 may be provided in an intermediate portion of the receiving portion 65 in the circumferential direction thereof in this manner.

Also, the engagement portions 66 or 80 may be provided on the entire circumferential portion of the receiving portion 65.

Further, any number of engagement portions 66 or 80, such as three or more engagement portions 66 or 80, may be provided on the receiving portion 65 in the circumferential direction thereof.

Although the receiving portion 65 has the engagement portions 66 or 80 in the above-described embodiment, the present disclosure is not limited to this. A configuration may be adopted in which the receiving portion 65 does not have an engagement portion 66 or 80.

Although the second route-regulating member 60 has two cable ties 62 in the above-described embodiment, the present disclosure is not limited to this, and a configuration may be adopted in which the second route-regulating member 60 has one, three, or more cable ties 62. Naturally, the number of engagement portions 66 or 80 may be changed according to the number of cable ties 62.

Although the cable tie 62 having the belt-shaped portion 68 and the locking portion 69 is used as a band in the above-described embodiment, the band may be changed to another pliable band that covers the entire circumference of the first route-regulating member 40 together with the receiving portion 65 and can bind the receiving portion 65 and the first route-regulating member 40 together.

The band may extend from one end portion of the receiving portion 65 in the circumferential direction, be fixed to the other end portion, and bind the receiving portion 65 and the first route-regulating member 40 together.

Figure 8:
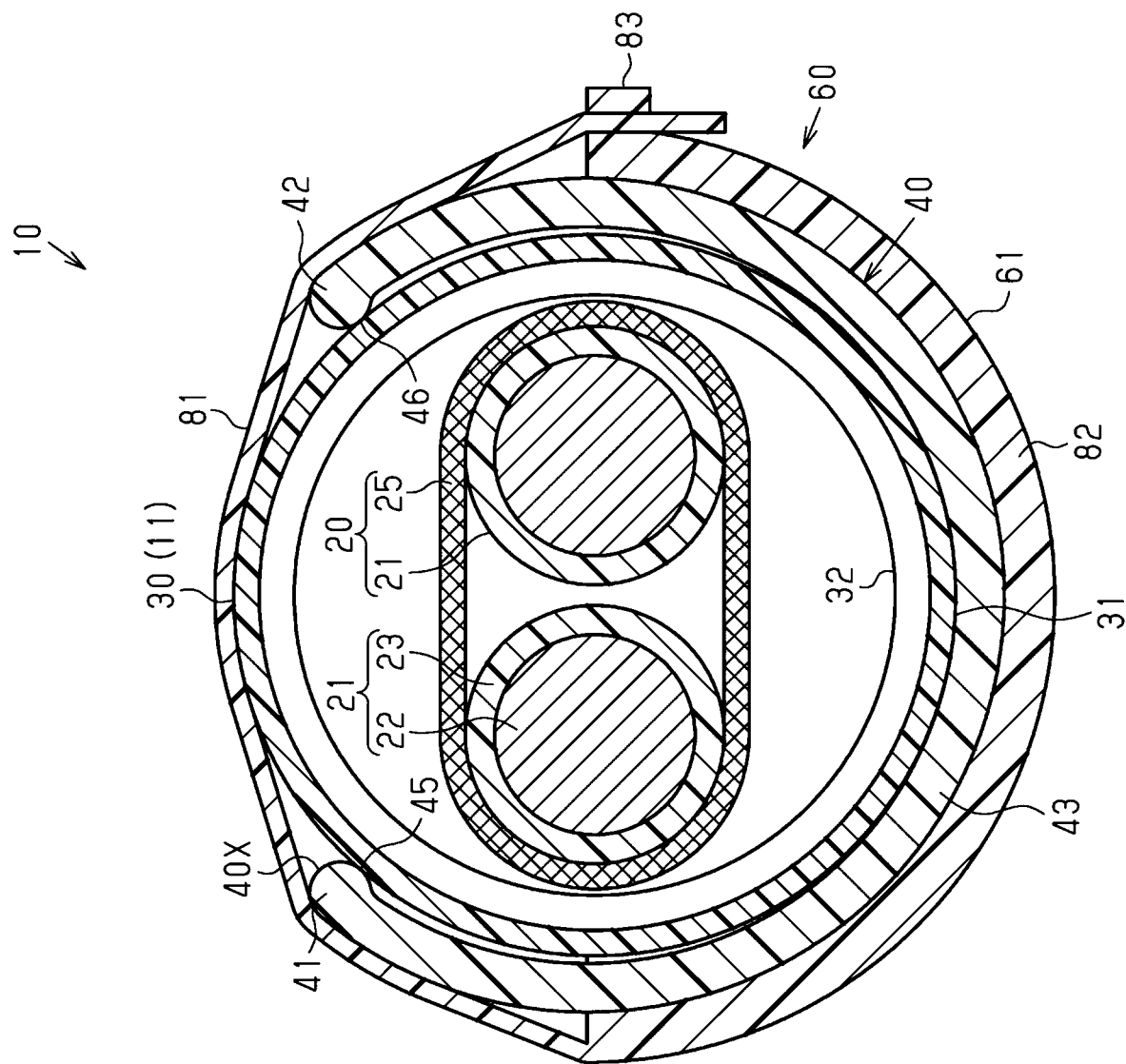
FIG. 8 is a schematic transverse cross-sectional view showing a wire harness according to a modified example.

Specifically, modifications can be made as shown in FIG. 8, for example. A band 81 in this example is integrated with a receiving portion 82. That is, the band 81 is a component integrally molded with the receiving portion 82. Note that the receiving portion 82 in this example does not have an engagement portion 66. The band 81 extends from one end portion of the receiving portion 82 in the circumferential direction thereof. The band 81 is thinner and more pliable than the receiving portion 82. A band locking portion 83 is provided at the other end portion of the receiving portion 82 in the circumferential direction thereof. The band locking portion 83 regulates movement of the band 81 in a removing direction that is a direction opposite to the direction in which the band 81 is passed therethrough, and locks the band 81, in a state in which the band 81 is passed therethrough. Also, the band 81 is passed through the band locking portion 83 while the band 81 covers the entire circumference of the first route-regulating member 40 together with the receiving portion 82, and binds the receiving portion 82 and the first route-regulating member 40 together.

As a result, the band 81 with a short length can bind the receiving portion 82 and the first route-regulating member 40 together. That is, it is possible to shorten the required length of the band, compared to the cable tie 62 that is attached so as to cover the entire circumferential portion of the receiving portion 65 and cover the entire circumference of the first route-regulating member 40 together with the receiving portion 65 as in the above-described embodiment, or the like. Also, because the band 81 is a component molded integrally with the receiving portion 82, the number of components can be reduced compared to another configuration, for example.

The second route-regulating member 60 of the above-described embodiment is formed so as to regulate the route of the bent section 11B of the wire harness main body 11, but there is no limitation to this. For example, the second route-regulating member 60 may be changed to a shape that regulates the route of the straight section 11A of the wire harness main body 11. The second route-regulating member 60 in this case is changed to, for example, a shape in which the bent shape of the main body portion 64 extends linearly.

Although the second route-regulating member 60 is embodied as an attachment member attached to the first route-regulating member 40 in the above-described embodiment, the present disclosure is no limited to this. The attachment member may be embodied as a vehicle attachment member for attaching the first route-regulating member 40 to the vehicle V, for example.

The structure of the first route-regulating member 40 of the above-described embodiment can be changed as appropriate. For example, as long as the first route-regulating member 40 has the insertion port 40X and has a structure with which the first route-regulating member 40 can be attached to the outer circumference of the outer cover member 30, there is no particular limitation to the other structures.

The protruding portion 45 of the above-described embodiment may be provided at a position farther from the insertion port 40X than the leading end of the first end portion 41 in the circumferential direction of the first route-regulating member 40.

The protruding portion 46 of the above-described embodiment may be provided at a position farther from the insertion port 40X than the leading end of the second end portion 42 in the circumferential direction of the first route-regulating member 40.

The protruding portions 45 and 46 of the above-described embodiment may also be partially provided in the lengthwise direction of the first route-regulating member 40.

At least one of the protruding portions 45 and 46 of the above-described embodiment may be omitted.

In the first route-regulating member 40 of the above-described embodiment, the thickness in the radial direction of the connection portion 43 may be changed in the circumferential direction.

The shape of the connection portion 43 in the first route-regulating member 40 of the above-described embodiment is not limited to an arc shape, and can be changed to, for example, an elliptical arc shape, a U shape, or the like.

In the above-described embodiment, the first route-regulating member 40 and the second route-regulating member 60 are more rigid than the outer cover member 30, but there is no limitation to this, and the hardness may be less than or equal to that of the outer cover member 30. That is, the first route-regulating member 40 and the second route-regulating member 60 need only act so that the wire harness main body 11 is less likely to bend than the wire harness main body 11 in the state where the first route-regulating member 40 and the second route-regulating member 60 are not attached.

For example, the outer cover member 30 in the above-described embodiment may be a resin corrugated tube with a metal layer that contains a metal material, formed on the outer surface thereof.

The outer cover member 30 in the above-described embodiment is not limited to being a corrugated tube, and may be an outer cover member that is not provided with a large-diameter portion 31 or a small-diameter portion 32, for example.

The outer cover member 30 in the above-described embodiment may have a slit that extends in the lengthwise direction of the outer cover member 30.

Although the electric wires 21 in the above-described embodiment are high-voltage electric wires, the present disclosure is not limited to such a configuration. For example, the electric wires 21 may be low-voltage electric wires.

In the electric wire member 20 in the above-described embodiment, an electromagnetic shield member is embodied as the braided member 25. However, the present disclosure is not limited to such a configuration. For example, the electromagnetic shield member in the electric wire member 20 may be embodied as a metal foil.

The braided member 25 of the electric wire member 20 in the above-described embodiment may be omitted.

In the above-described embodiment, the number of electric wires 21 included in the electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate depending on the vehicle configuration.

In the above-described embodiment, a plurality of on-board devices to which the wire harness 10 is to be electrically connected are embodied as the inverter M1 and the high-voltage battery M2. However, the present disclosure is not limited to such a configuration. The plurality of on-board devices to which the wire harness 10 is to be electrically connected are not particularly limited as long as they are electric devices to be mounted in the vehicle V.

The embodiments disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

What is claimed is:

1. A wire harness comprising:

a wire harness main body including an electric wire and an outer cover covering an outer circumference of the electric wire;

a first route regulator that is attached to an outer circumference of the outer cover and regulates a route of the wire harness main body; and an attachment that is attached to a portion of an outer circumference of the first route regulator in a lengthwise direction of the first route regulator, wherein:

the first route regulator includes an insertion port that is open in a direction orthogonal to the lengthwise direction of the first route regulator and extends along an entire first route regulator in the lengthwise direction of the first route regulator, the attachment includes a receiver covering a portion in a circumferential direction of the first route regulator, and a pliable band that covers an entire circumference of the first route regulator together with the receiver and binds the receiver and the first route regulator together, the receiver includes an engagement including a through-hole through which the band passes, and a thickness of the first route regulator in a radial direction varies in the circumferential direction, wherein the outer cover has an accordion structure in which large-diameter portions and small-diameter portions are alternately provided along a lengthwise direction of the outer cover, and the attachment is a second route regulator having a body portion that is attached to the large-diameter portion of the outer cover and regulates the route of the wire harness main body.

2. The wire harness according to claim 1, wherein:

the band is a cable tie that includes a pliable belt and a lock that is provided at an end of the belt in a lengthwise direction of the belt and regulates movement of the belt in a removing direction, which is a direction opposite to a direction in which the belt is passed therethrough, in a state in which the belt is passed therethrough, and the cable tie is attached so as to cover an entire circumferential portion of the receiver and cover the entire circumference of the first route regulator together with the receiver.

3. The wire harness according to claim 2, wherein the engagement is configured to engage with the belt in a lengthwise direction of the receiver.

4. The wire harness according to claim 3, wherein the engagement is a plurality of engagements, each of the engagements being provided at one of two ends of the receiver in a circumferential direction of the receiver, and each of the engagements respectively includes a through-hole.

5. The wire harness according to claim 1, wherein the band extends from one end of the receiver in the circumferential direction of the receiver, is fixed to the other end, and binds the receiver and the first route regulator together.

6. The wire harness according to claim 5, wherein the band is a component molded integrally with the receiver.

7. The wire harness according to claim 1, wherein:

the receiver is formed at an end of the body portion in a lengthwise direction of the second route regulator and covers a circumferential portion of an end of the first route regulator in the lengthwise direction of the first route regulator.

8. The wire harness according to claim 7, wherein:

a straight shape portion of the first route regulator regulates a first section of the route of the wire harness main body, which is a section having a linear shape in the route of the wire harness main body, and a bent section of the body portion of the second route regulator regulates a second section of the route of the wire harness main body, which is a section that is bent in the route of the wire harness main body.

* * * * *